United States Patent

Owens

[15] 3,693,177

[45] Sept. 19, 1972

[54] CONDUCTOR ARRANGEMENT FOR PROPAGATION IN MAGNETIC BUBBLE DOMAIN SYSTEMS

[72] Inventor: John M. Owens, Newport Beach, Calif.

[73] Assignee: North American Rockwell Corporation

[22] Filed: March 12, 1971

[21] Appl. No.: 123,639

[52] U.S. Cl..340/174 TF, 340/174 SR, 340/174 NA, 340/174 VA

[51] Int. Cl...........................G11c 11/14, G11c 19/00

[58] Field of Search..................................340/174 TF

[56] References Cited

UNITED STATES PATENTS 3,540,019 11/1970 Bobeck et al. ........340/174 TF
3,506,975 4/1970 Bobeck et al. ........340/174 TF
3,631,413 12/1971 Copeland.............340/174 TF

*Primary Examiner*—James W. Moffitt
*Attorney*—L. Lee Humphries, H. Fredrick Hamann and Joseph E. Kieninger

[57] ABSTRACT

A conductor arrangement for the propagation of single wall domains in a magnetic bubble domain system is disclosed. An elongated conductor on a restricted portion of a strip of film of a magnetic bubble domain material provides a field gradient which causes the magnetic bubble domain to be moved from a nonrestricted portion through the restricted portion to a second nonrestricted portion of the strip.

5 Claims, 1 Drawing Figure

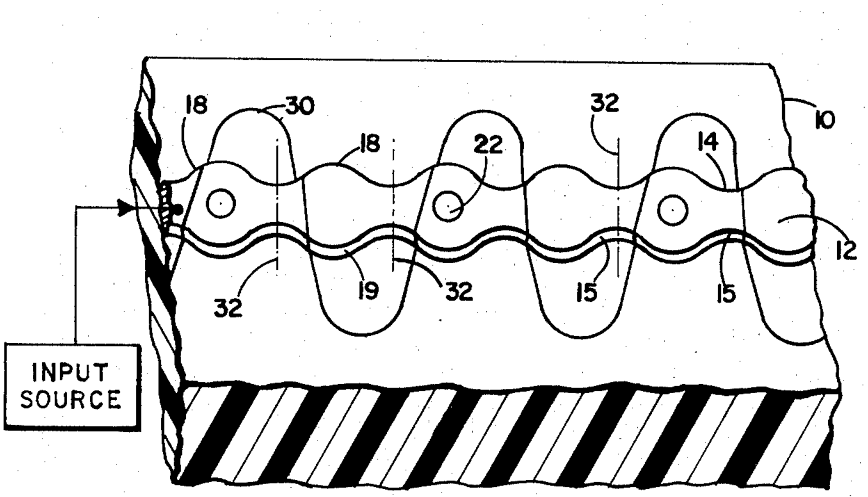
INVENTOR
JOHN M. OWENS
BY
Joseph E. Kieninger
ATTORNEY

CONDUCTOR ARRANGEMENT FOR PROPAGATION IN MAGNETIC BUBBLE DOMAIN SYSTEMS

FIELD OF THE INVENTION

This invention relates to magnetic bubble domains and more particularly to a conductor arrangement for the propagation of single wall domains in a strip or channel of bubble domain material.

BACKGROUND OF THE INVENTION

Magnetic domains and the propagation thereof in a sheet of a magnetic medium are well known in the art and are described in U.S. Pat. Nos. 3,503,054; 3,506,975; 3,541,535; 3,543,252; 3,543,255 and others. In general, the systems described in these patents employ a complex metal arrangement to control the positions of the bubbles as well as the movement of the bubbles in a sheet of magnetic bubble domain material. These systems attempt to minimize the repulsive or interaction forces between the individual bubbles by separating the individual bubbles from each other by a distance which is about three or more bubble domain diameters. These methods endeavor to substantially eliminate or minimize as much as possible the interaction forces between bubbles.

In a copending patent application to David Heinz, U.S. Ser. No. 81,232, assigned to the Assignee of the present invention, a magnetic bubble domain system utilizing an entirely different concept from the aforementioned patents comprising one or more channels or strips of magnetic bubble domain material on a supporting substrate is described. Any number of individual magnetic bubble domain channels may be interconnected or connected to a main channel. The movement of bubble domains along a channel or strip is affected by the repulsive or reaction forces between bubble domains which are present in a channel when a bubble domain is formed or propagated near another bubble domain. The movement of bubbles from a given channel into one of several possible adjoining channels to form a logic function may be directed by the presence or absence of bubbles in one or more connecting channels. This application is incorporated herewith by reference thereto.

Another patent application assigned to the Assignee of the present invention, U.S. Ser. No. 101,741, to Jack Mee et al., describes a method which controls the presence of bubble domains near the edge of a magnetic film in a film-substrate structure. The magnetic film is etched to provide a smooth, well-defined edge. The newly formed edge of the film repels the bubble domains therefrom thereby causing the bubble domains to be confined substantially to the center of the strip of film or to the center of the film disk. This application is incorporated herewith by reference thereto.

In a patent application assigned to the Assignee of the present invention, U.S. Ser. No. 123,644, to John Owens et al., a magnetic bubble domain system for bubble domains located in specific equilibrium positions in a strip or channel of magnetic bubble domain material film associated with a supporting substrate is described. The strip has at least one restricted portion therein which determines the position of a bubble domain in a nonrestricted strip portion associated therewith. The positions or location of bubble domains in a strip of bubble domain film is predetermined by the proper spacing of restrictive strip portions.

SUMMARY OF THE INVENTION

It is an object of this invention to provide an improved bubble domain system.

It is another object of this invention to provide a propagation system for a bubble domain system.

It is yet another object of this invention to provide a conductor arrangement suitable for the propagation of single wall domains in a strip of bubble domain material.

It is still another object of this invention to avoid the total reliance on metal patterns for controlling the position and movement of bubble domains.

These and other objects of this invention are realized by a magnetic bubble domain system in which a strip or channel of film of bubble domain material having at least one restricted portion and at least one nonrestricted portion is, preferably, positioned on a substrate. An elongated conductor is positioned on said restricted portion. The bubble domains which are repulsed from the edges of the strip to reach an equilibrium condition within the unrestricted region. By proper application of a field gradient generated by a current in the elongated conductor, the bubble domain can be propagated from one unrestricted portion through the restricted portion to a second nonrestricted portion of the strip.

Other objects and advantages of this invention will be apparent from the following detailed description wherein a preferred embodiment of the present invention is clearly shown.

BRIEF DESCRIPTION OF THE DRAWING

The drawing is a view partially in section and partially in elevation of a conductor arrangement in accordance with this invention.

DESCRIPTION OF AN ILLUSTRATIVE EMBODIMENT

In general, the invention is concerned with a conductor arrangement on a strip or channel of bubble domain material having a series of nonrestricted portions separated by a restricted portion. The conductor is positioned on top of the restricted portion, preferably adjacent to one side of the center thereof.

As shown in the drawing, a monocrystalline substrate 10 is subjected to a chemical vapor deposition step to provide a thin film of magnetic bubble domain material which is subsequently etched to provide a strip or channel 12. The deposition step is carried out in accordance with the copending patent application, Ser. No. 833,268, filed June 16, 1969 and now abandoned, by Mee et al., and assigned to the Assignee of the present invention. This patent application is incorporated herewith by reference thereto.

The substrate 10 is preferably a monocrystalline garnet having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium, and bismuth; and the Q constituent of the wafer formulation is at least one element from the group consisting of indium, gallium, scandium, titanium, vanadium, chromium, manganese, rhodium, zirconium, hafnium, niobium, tantalum, aluminum, phosphorus, arsenic and antimony.

Examples of suitable substrate materials are $Y_{0.45}$, $Gd_{2.55}$, $Ga_5O_{12}$, $Dy_{0.65}Gd_{2.35}Ga_5O_{12}$ and $Sm_3Ga_5O_{12}$.

The film strip or channel 12 of bubble domain material is, preferably, a single crystal garnet having a $J_3Q_5O_{12}$ formulation wherein the J constituent of the film formulation has at least one element selected from the group of cerium, praseodymium, neodymium, promethium, samarium, europium, gadolinium, terbium, dysprosium, holmium, erbium, thulium, ytterbium, lutetium, lanthanum, and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Preferred film materials are iron garnets such as $Y_3Ga_{1.2}Fe_{3.8}O_{12}$ and $Tb_3Fe_5O_{12}$.

The composite iron garnet film-substrate structure has a film with a given magnetostriction constant and a given difference between the lattice constants of the film and substrate. This requirement is discussed in detail in the copending patent applications, U.S. Ser. Nos. 101,786, 101,785 101,787, by Mee et al., which are incorporated herewith by reference thereto.

While garnets are the preferred materials for the substrate thin film, other oxide materials may be used for the substrate, especially when the film is formed of an orthoferrite material.

The strip or channel 12 is formed preferably by an etchant step either using etchant photolithographic techniques of the type commonly used in the semiconductor industry and by employing an etchant such as hot phosphoric acid to form the edges 14 and 15 on the restricted portion 16 as well as the edges 18 and 19 on the nonrestricted portions 20. While chemical etching is the preferred manner of forming the channel or strip 12, other methods such as sputter etching, laser machining and the like may be used.

While the strip of film of magnetic bubble domain material has been described as a film positioned on top of a substrate and as shown in the FIG. 1, the strip of magnetic bubble domain material may be positioned in a depression in the surface of the substrate or the strip of bubble domain material may be surrounded by a material having different magnetic properties. The alternative embodiments of the strip of bubble domain material are described in a copending patent application, U.S. Ser. No. 123,643, to Owens et al and assigned to the Assignee of the present invention and is incorporated herewith by reference thereto.

Another embodiment of channel 12 would be similar to that shown in the FIGURE except that the sides of the channel would not be etched completely through the film thickness to the substrate surface. The channel in this case is formed by grooves etched into the film wherein the etched grooves extend into the film a thickness of about 10 percent to about 95 percent of the total thickness of the film. The channels formed by the partial etching of the film are described in detail in the copending application assigned to the Assignee of the present invention, U.S. Ser. No. 130,128.

An elongated conductor 30 is deposited on top of the substrate 10 and the strip 12 in the form of a loop geometry. The elongated conductor may be formed of any suitable conductive metal, such as copper, silver, gold, aluminum and the like. The conductor 30 is deposited on the film-substrate structure by conventional methods well known in the art. The conductor 30 is deposited, preferably, just off of the center 32 of the restricted portion 16.

The bubble domains 22 are repelled from the edges 14, 15, 18 and 19 of the film strip 12 thereby effectively establishing an equilibrium position for the bubble domain 22 in the center of the nonrestrictive portion 20. By passing a current through the elongated conductor 30, a field gradient is formed in the channel 12 having a strong field gradient near the center 32 of the restricted portion 16 and a relatively weak field gradient near the center of the nonrestricted portion 20. Establishing a field gradient in the channel 12 causes the bubble 22 to move from the center of one nonrestricted portion 20 through the restricted portion 16 into the adjacent nonrestricted portion 20 on the other side of the conductor 30. The direction in which the bubbles 22 move is determined by the direction which the current conductor 30 is shifted off center of the restriction 32. When shifted to the right, propagation will occur to the left and visa versa. Propagation down the strip is accomplished by the application of an alternating current to the conductor 30. The field gradient established by a conductor 30 overcomes the repulsive effect that the edges of the channel 12 have in establishing an equilibrium position for the bubble domain in the nonrestricted portion.

The propagation affected with the conductor arrangement described in this invention will provide a bubble domain density of at least one bubble domain in every other nonrestricted portion as shown in the FIGURE. That is, a bubble domain 22 is in a first nonrestricted portion of channel 12 and in the third nonrestricted portion whereas there would not be a bubble in the second nonrestricted portion.

I claim:

1. In a magnetic bubble domain system, a combination comprising a substrate, a strip of film of a magnetic bubble domain material associated with said substrate, said strip containing at least two nonrestricted portions and at least one restricted portion, input means for providing a single wall domain in said strip, and propagation means for controllably moving said domain in said strip from said one nonrestricted portion through said restricted portion to said second nonrestricted portion.

2. A combination in accordance with claim 1 wherein said propagation means comprises an elongated conductor positioned on said restricted portion.

3. A combination in accordance with claim 2 wherein said elongated conductor is positioned to one side of the center of said restricted portion.

4. A combination in accordance with claim 2 wherein said elongated conductor is positioned on a plurality of different restricted portions.

5. A combination in accordance with claim 2 wherein said elongated conductor is spaced apart from said nonrestricted portion.

* * * * *